United States Patent [19]

Morikawa

[11] Patent Number: 6,132,107

[45] Date of Patent: Oct. 17, 2000

[54] LIGHT-RECEIVING MODULE AND METHOD FOR FABRICATING A SAME

[75] Inventor: Takenori Morikawa, Tokyo, Japan

[73] Assignee: NEC Corporation, Tokyo, Japan

[21] Appl. No.: 08/940,049

[22] Filed: Sep. 30, 1997

[30] Foreign Application Priority Data

Sep. 30, 1996 [JP] Japan .................................. 8-258830

[51] Int. Cl.[7] .................................................. G02B 6/42
[52] U.S. Cl. ............................... 385/89; 385/49; 385/88; 257/432
[58] Field of Search .................................. 385/49, 88, 89, 385/50, 52, 137, 47, 92; 257/81, 82, 84, 85, 88, 431–433, 436; 438/65

[56] References Cited

U.S. PATENT DOCUMENTS

| | | | |
|---|---|---|---|
| 5,071,213 | 12/1991 | Chan | 385/52 |
| 5,073,003 | 12/1991 | Clark | 385/33 |
| 5,479,540 | 12/1995 | Boudreau et al. | 385/14 |
| 5,555,333 | 9/1996 | Kato | 385/89 |
| 5,880,525 | 3/1999 | Boudreau et al. | 257/752 |

FOREIGN PATENT DOCUMENTS

| | | |
|---|---|---|
| 61-242069 | 10/1986 | Japan . |
| 7-77632 | 3/1995 | Japan . |
| 8-21930 | 1/1996 | Japan . |

*Primary Examiner*—Rodney Bovernick
*Assistant Examiner*—Michael J. Stahl
*Attorney, Agent, or Firm*—Hutchins, Wheeler & Ditmar

[57] ABSTRACT

It is an object of the invention to provide a light-receiving module, in which alignments of optical axes of optical fibers and photodiodes can be easily carried out and efficiencies of light incidences on the photodiodes are not influenced by imperfections in a fabrication process. The light-receiving module according to the invention is composed of a photodiode-forming member and an optical fiber-supporting member. The photodiode-forming member is composed of light-receiving surfaces of the photodiode formed thereon and bank-shaped optical fiber-fixing guides for guiding the optical fibers along both their sides. The optical fiber-supporting member is composed of optical fiber-fixing grooves for fixing parts of the optical fibers near their output ends and reflector surfaces for changing directions of the lights emitted from light-emitting surfaces of the optical fibers. An attitude of the photodiode-forming member relative to the optical fiber-supporting member is so adjusted that the lights reflected by the reflector surfaces are precisely incident on the light-receiving surfaces of the photodiodes, and both the photodiode-forming and optical fiber-supporting members are stuck together.

20 Claims, 11 Drawing Sheets

LIGHT-RECEIVING MODULE AND METHOD FOR FABRICATING A SAME

FIELD OF THE INVENTION

The invention relates to a light-receiving module and a method for fabricating the same and especially to the light-receiving module and the method for fabricating the same suitably applicable to interconnection in optical communication.

BACKGROUND OF THE INVENTION

A light-receiving module is fabricated by sticking an optical fiber-supporting member and a photodiode-forming member together, in which lights emitted from light-emitting surfaces of optical fibers arrayed in parallel with each other at certain intervals on the optical fiber-supporting member are respectively received by light-receiving surfaces of photodiodes arrayed at the aforementioned certain intervals on the photodiode-forming member.

The optical fibers are respectively held between optical fiber-fixing grooves on the optical fiber-supporting member and optical fiber-positioning grooves on the photodiode-forming member in most cases. The lights emitted from the light-emitting surfaces of the optical fibers are respectively reflected by reflector surfaces formed at side ends of the optical fiber-fixing grooves and incident on the light-receiving surfaces of the photodiodes. However, the optical fiber-positioning grooves are formed by etching on a substrate in most cases, and then their surfaces are rough. Accordingly, positions of the light emitting surfaces of the optical fibers are fluctuated, and it sometimes occurs that the lights emitted from the light-emitting surfaces of the optical fibers are scattered by side edges of the optical fiber-positioning grooves and light-receiving efficiencies of the photodiodes decrease.

SUMMARY OF THE INVENTION

Accordingly, it is an object of the invention to provide a light-receiving module, and a method for fabricating a light-receiving module in which alignment of optical axes of optical fibers and photodiodes are easily carried out and efficiencies of light incidences on photodiodes are not deteriorated by imperfections of a fabrication process.

According to the first feature of the invention, a light-receiving module comprises:

an optical fiber-supporting member, which is provided with;

one or more optical fiber-fixing grooves formed on a surface of a first substrate for fixing one or more parts of one or more optical fibers near their output ends, and one or more light direction-changing means formed at side ends of the optical fiber-fixing grooves and directing one or more lights emitted from one or more light-emitting surfaces of the one or more optical fibers, and a photodiode-forming member, which is provided with:

one or more photodiodes having one or more light receiving surfaces and arrayed on a second substrate at certain intervals, the one or more light receiving surfaces being set close to the one or more light-emitting surfaces of the one or more optical fibers, and one or more means for pressing the one or more optical fibers against the optical fiber-fixing grooves without masking the one or more light-emitting surfaces, wherein, an attitude of the photodiode-forming member relative to the optical fiber-supporting member is so adjusted that the one or more lights precisely incident on the corresponding one or more light receiving surfaces, and both the photodiode-forming and optical fiber-supporting members are stuck together keeping the relative attitude unchanged.

According to the second feature of the invention, a method for fabricating a light-receiving module comprises the steps of:

forming one or more optical fiber-fixing grooves for fixing one or more parts of one or more optical fibers near their side ends on a first substrate, the one or more optical fiber-fixing grooves running in parallel with each at certain intervals, forming one or more light direction-changing means for changing one or more directions of or more lights incident thereon by almost right angles, formed at one or more side ends of the one or more optical fiber-fixing grooves, forming a reflector layer over a whole surface of the first substrate or the one or more light direction-changing means, forming an insulator layer over the whole surface of the first substrate or the one or more light direction-changing means and consequently obtaining an optical fiber-supporting member, forming one or more optical fiber-fixing guides for guiding the one or more optical fibers along both their sides, which run in parallel with one or more optical axes of the one or more optical fibers, on a surface of a second substrate at the certain intervals, forming one or more P-type regions by means of selective ion implantation near one or more side ends of the one or more optical fiber-fixing guides, which are communicated with the one or more P-type regions on the second substrate and consequently obtaining a photodiode-forming member, so adjusting an attitude of the photodiode-forming member relative to the optical fiber-supporting member that the one or more lights emitted from the one or more light-emitting surfaces of the one or more optical fibers incident on the corresponding one or more light-receiving surfaces of the one or more photodiodes, after their directions are changed by the corresponding one or more light direction-changing means, and sticking the photodiode-forming and optical fiber-supporting members together keeping the relative attitude unchanged.

BRIEF DESCRIPTION OF THE DRAWINGS

The invention will be explained in more detail in conjunctions with appended drawings, wherein.

DESCRIPTION OF THE PREFERRED EMBODIMENT

Before explaining a light-receiving module and a method for manufacturing the same in the preferred embodiments according to the invention, the aforementioned conventional light-receiving module will be explained referring to FIG. 1 and FIGS. 2A to 2B.

Figure 1:
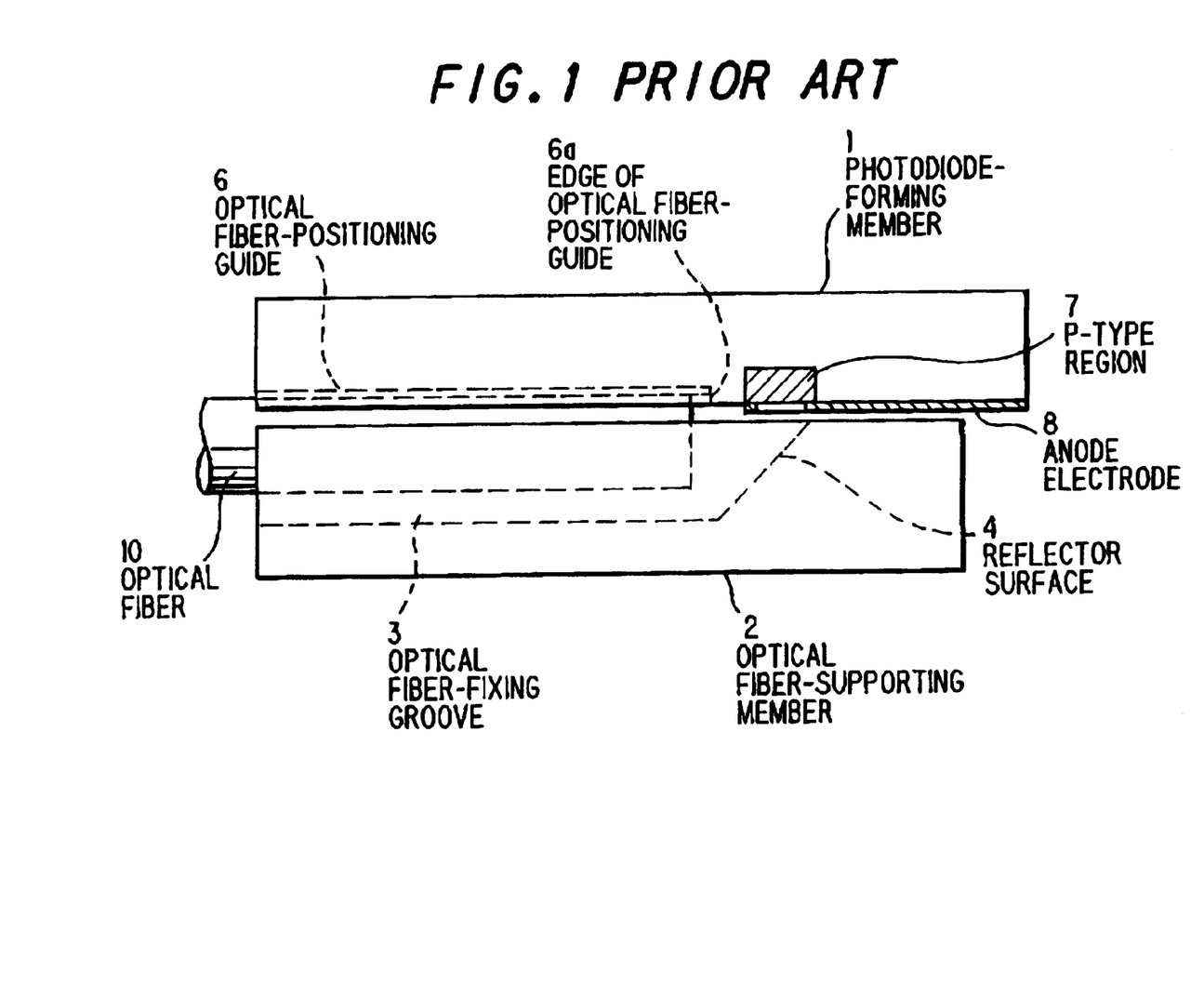
FIG. 1 is a cross-sectional view showing an outline of a structure of a conventional light-receiving module.
Figure 2A:
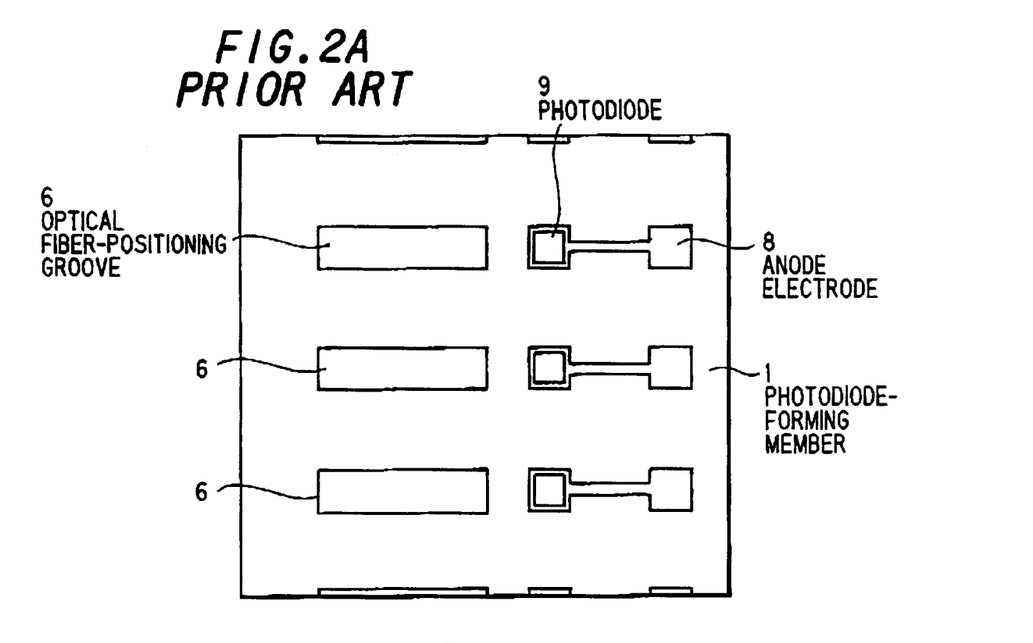
FIGS. 2A and 2B respectively show a planar view of a photodiode-forming member and that of an optical fiber-supporting member in the light-receiving module shown in FIG. 1.
Figure 2B:
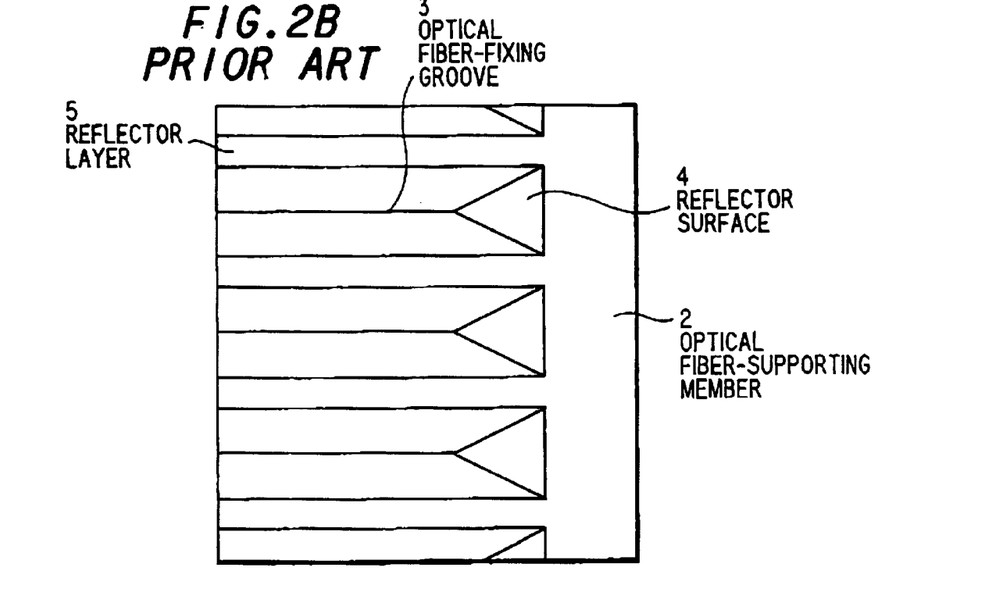

An out line of a structure of a conventional light-receiving module disclosed in Japanese Patent Kokai No. 7-77632 is shown in FIG. 1 and FIGS. 2A to 2B. Explaining in more detail, FIG. 1 shows a cross-sectional view of a light-receiving module, FIG. 2A shows a planar view of a photodiode-forming member 1 of the same and FIG. 2B shows a planar view of an optical fiber-supporting member 2 of the same.

As shown in FIG. 2B, optical fiber-fixing grooves 3 and reflector surfaces 4 are formed on a surface of the optical fiber-supporting member 2 at certain intervals, and a reflector layer 5 and an insulator layer (not shown) are formed over the whole surface of the optical fiber-supporting member 2.

As shown in FIG. 2A, the photodiode-forming member 1 is made of a Si substrate, and an optical fiber-positioning guide 6 is formed on a region opposing to an optical fiber-fixing groove 3 on the optical fiber-supporting member 2. On the photodiode-forming member 1, a nearly square-shaped P-type region 7 is formed on a region opposing to a reflector surface 4 on the optical fiber-supporting member 2, and the P-type region 7 and the photodiode-forming member 1 made of the N-type substrate compose a photodiode 9. Moreover, on the photodiode-forming member 1, an anode electrode 8 of the photodiode 9 is formed near the photodiode 9. According to this light-receiving module, since the optical fiber-positioning guide 6 is formed on the photodiode-forming member 1, alignment of optical axes of the optical fibers and the photodiodes can be easily carried out, and a light emitted from a light emitting surface of an optical fiber 10 can be incident on the photodiode 7 with high efficiency.

However, the aforementioned light-receiving module has a following disadvantage. As shown in FIG. 1, it sometimes occurs that the light emitted from the optical fiber 10 is reflected by a right edge 6a of the optical fiber-positioning guide 6, before the light reaches the photodiode 9, and the efficiency of the light incidence on the photodiode is decreased. The reason is that, depths of the optical fiber-positioning guides 6 formed on the photodiode-forming member 1 are fluctuated by etching condition.

Hereinafter, preferred embodiments of the invention will be explained referred to appended drawings.

A. The first preferred embodiment

Figure 3:
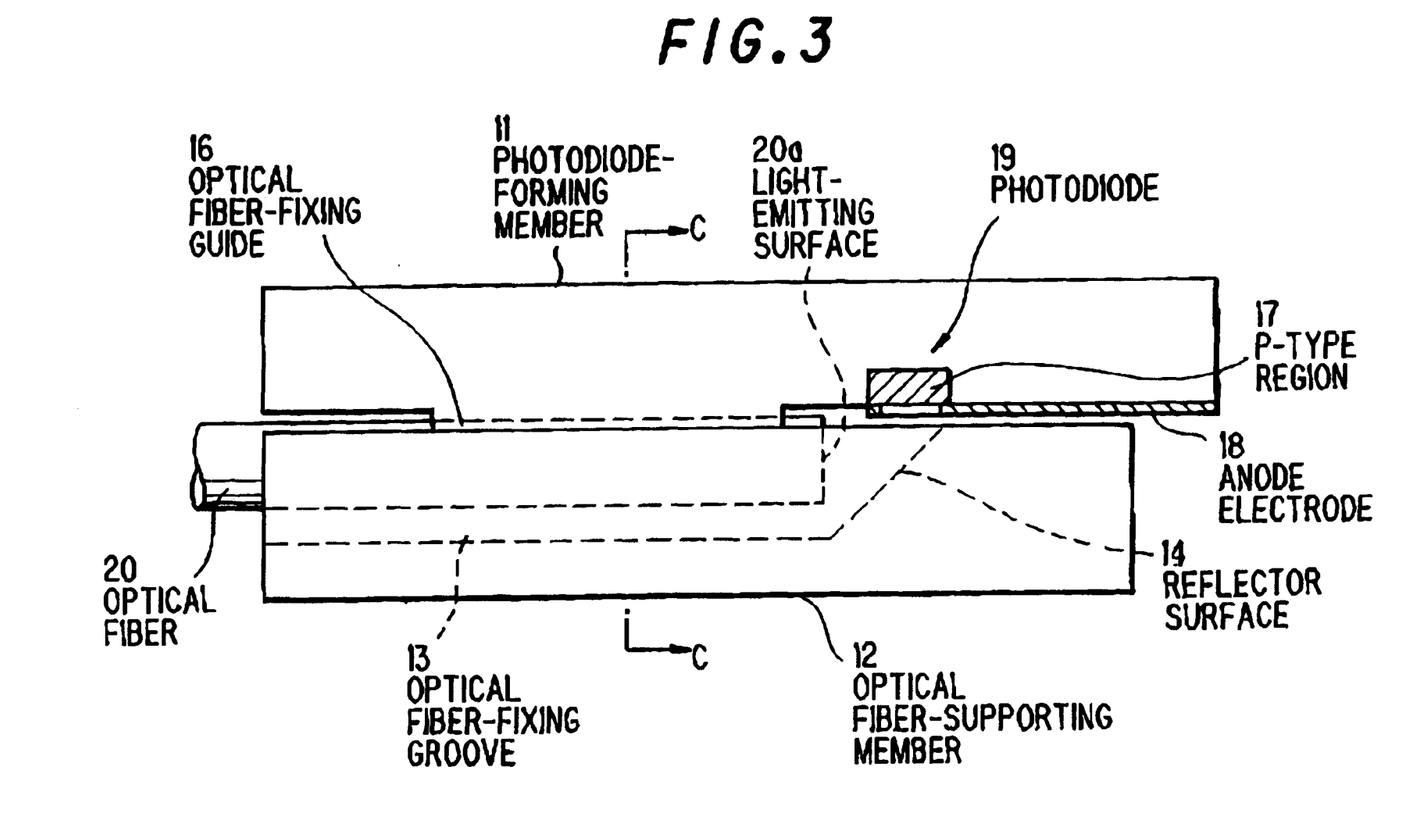
FIG. 3 is a cross-sectional view of a light-receiving module shown as the first preferred embodiment of the invention.
Figure 4A:
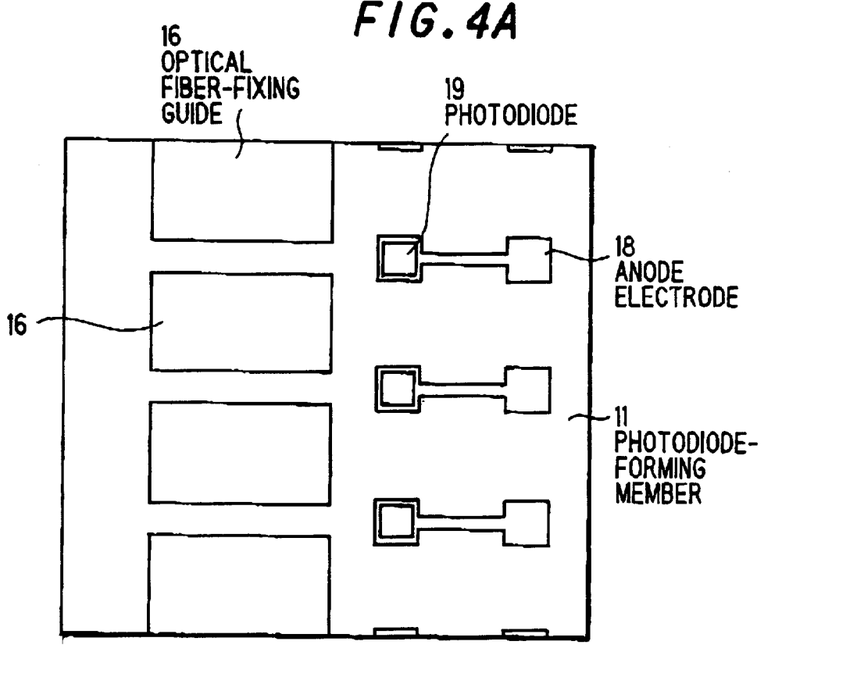
FIGS. 4A to 4C are planar views showing structures of the photodiode-forming and optical fiber-supporting members of the light-receiving module shown in FIG. 3, FIGS. 5A to 5D show a process of fabrication of the light-receiving module shown in FIG. 3, FIGS. 6A to 6C show a process of fabrication of the light-receiving module shown in FIG. 3 continued from FIGS. 5A to 5D.
Figure 4B:
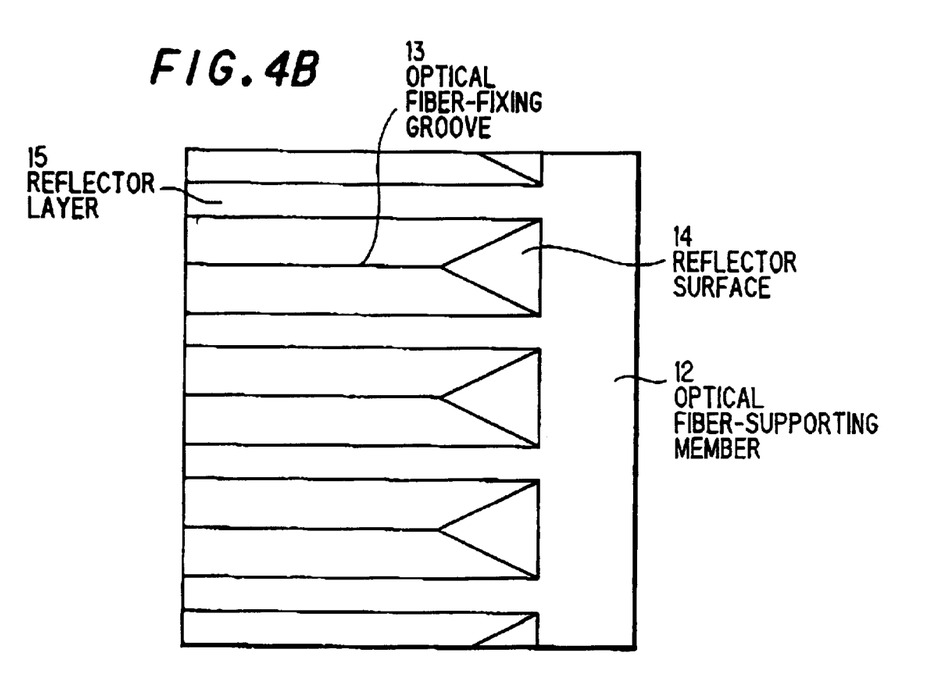
Figure 4C:
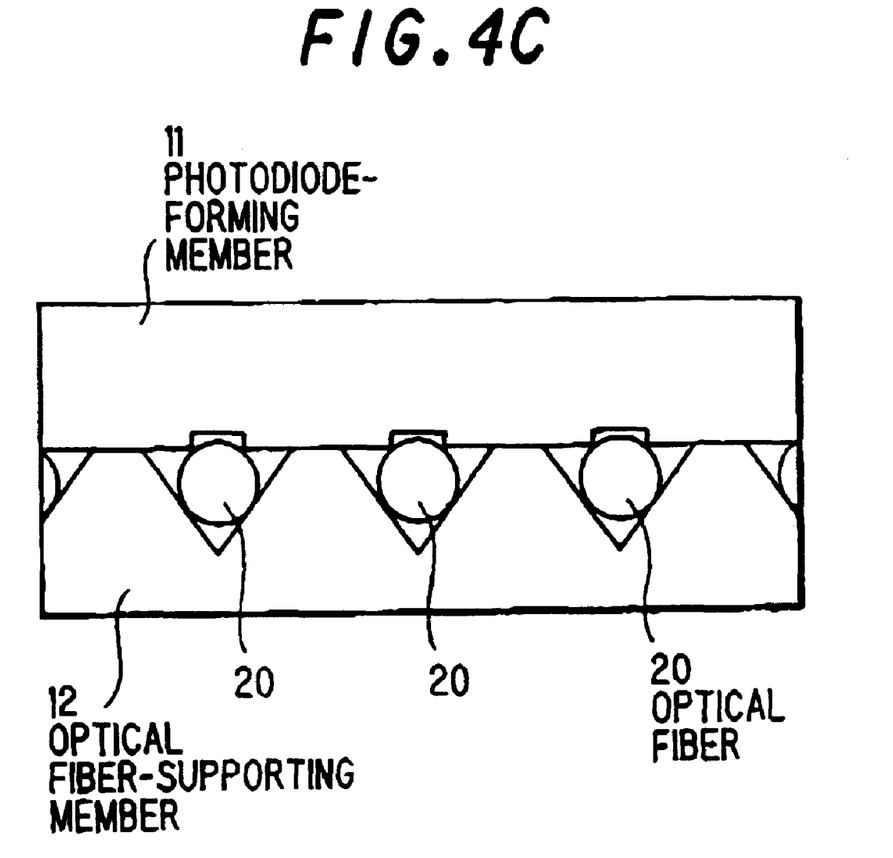

FIG. 3 and FIGS. 4A to 4C show outlines of a structure of a light-receiving module according to the first preferred embodiment of the invention. Explaining in more detail, FIG. 3 is a cross-sectional view of the light-receiving module, FIG. 4A is a planar view of a photodiode-forming member 11, and FIG. 4B is a planar view of an optical fiber-supporting member 12. FIG. 4C is a cross-sectional view of the light-receiving module shown in FIG. 3 in a C—C cross-section.

The optical fiber-supporting member 12 is made of a Si substrate, and an optical fiber-fixing groove 13 and a reflector surface 14 are formed at certain intervals thereon. Over a whole surface of the optical fiber-supporting member 12, reflector layer 15 made of Au and an oxide layer (not shown) serving as an insulator layer are successively formed.

On the other hand, a photodiode-forming member 11 is made of a N—Si substrate, and an optical fiber-fixing guide 16 is formed on a position, which opposite to both side surfaces of the optical fiber-fixing groove 13 on the optical fiber-supporting member 12. Moreover, on the photodiode-forming member 11, a nearly square-shaped P-type region 17 is formed on a position, which opposes to a reflector surface 14 on the optical fiber-supporting member 12, and the P-type region 17 and the photodiode-forming-member 11 made of the N—Si substrate form a photodiode 19. Moreover, on the photodiode-forming member 11, an anode electrode 18 of the photodiode 19 is formed near the photodiode 19. In the light-receiving module, a position of an optical fiber 20 on the photodiode-forming member 11 is so adjusted that a light emitted from a light-emitting surface 20a of the optical fiber 20 is precisely incident on the photodiode 19 on the photodiode-forming member 11, and thereafter the photodiode-forming member 11 and the optical fiber-supporting member 12 are stuck together.

Figure 5A:
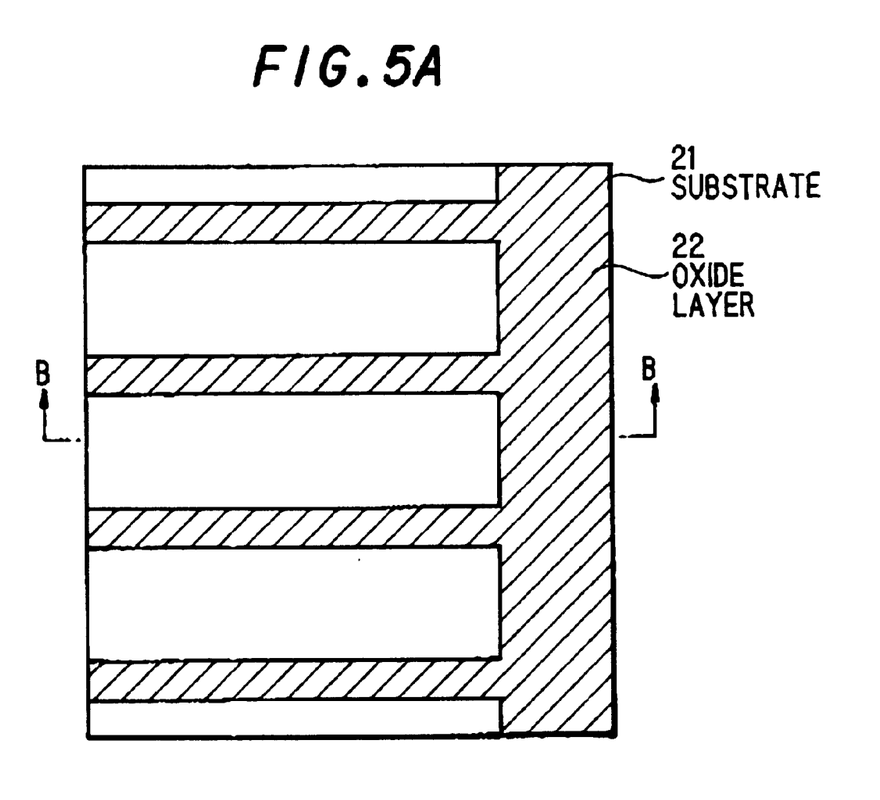
Figure 5B:
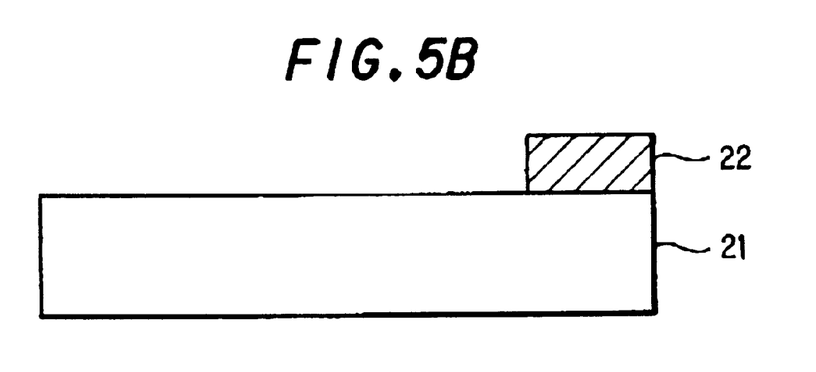
Figure 5C:
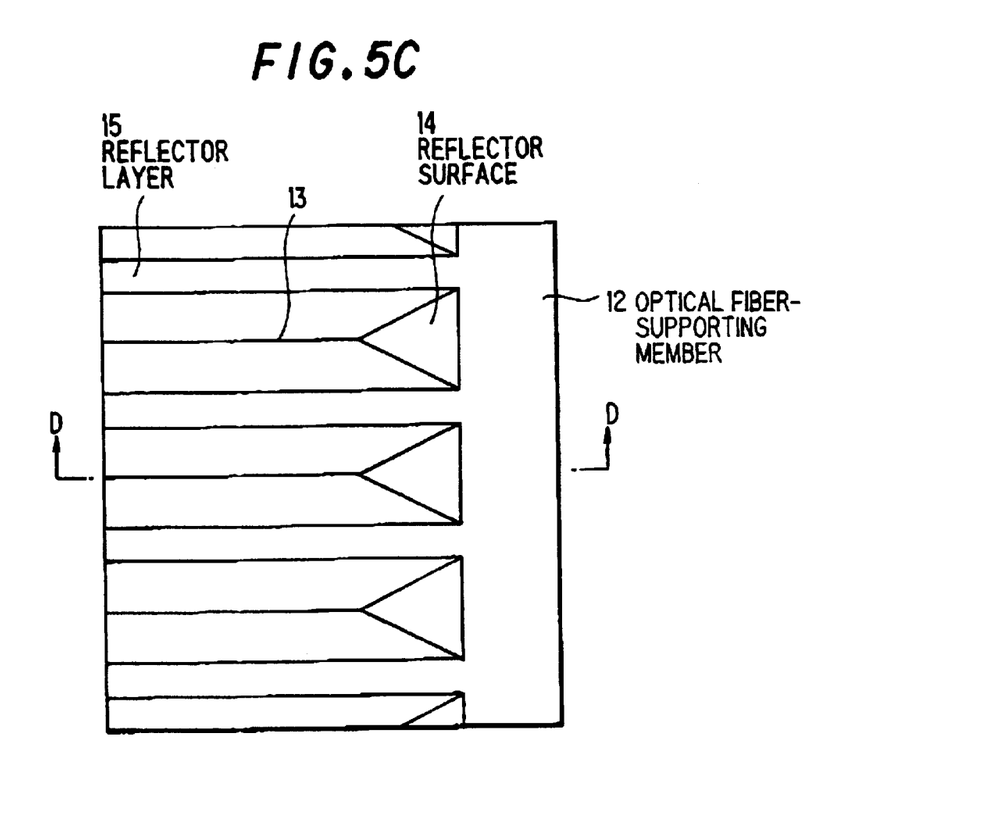
Figure 5D:
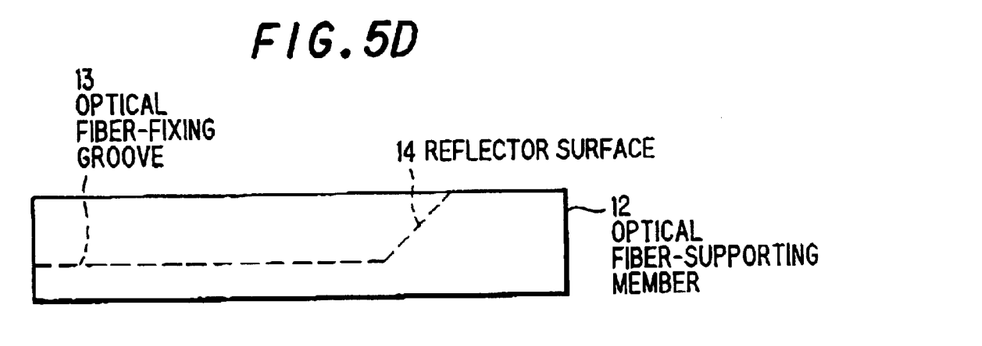
Figure 6A:
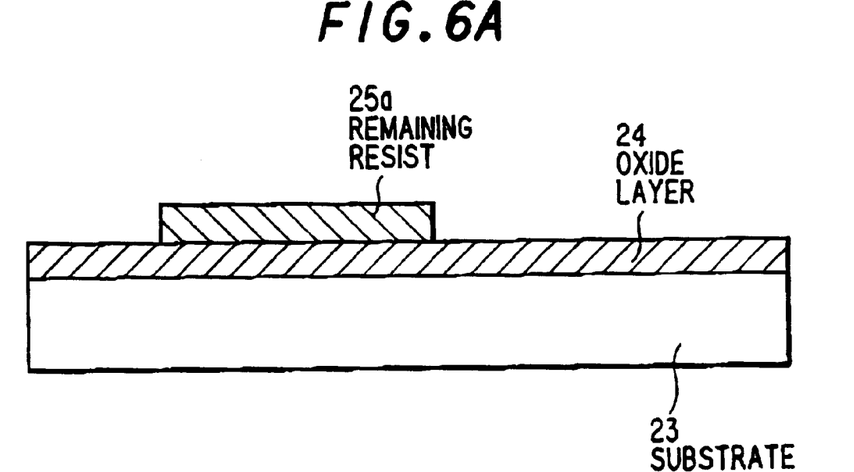
Figure 6B:
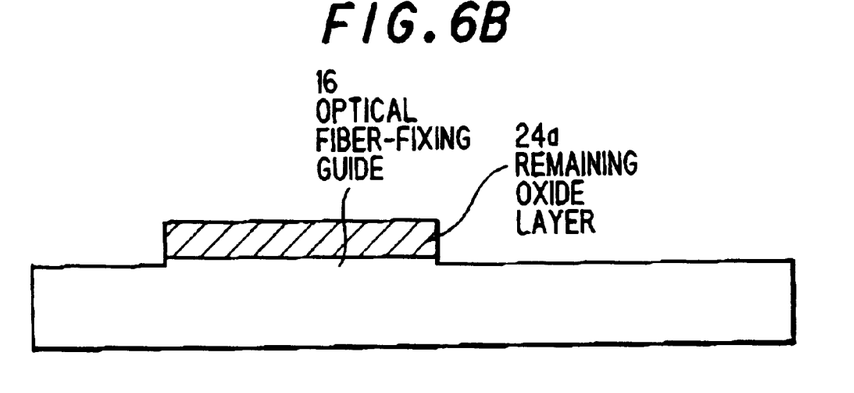
Figure 6C:
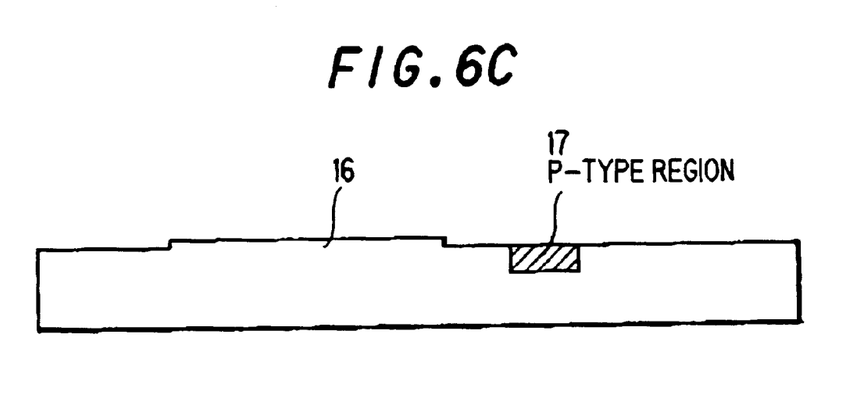

Next, a method for fabricating the light-receiving module mentioned in the above will be explained referring to FIGS. 5A to 5D and FIGS. 6A to 6C. FIGS. 5A to 5C are respectively planar views of the optical fiber-supporting member 12 in the fabrication process. FIG. 5B is a cross-sectional view taken along a line B—B in FIG. 5A, and FIG. 5D is a cross-sectional view taken along a line D—D in FIG. 5C. FIGS. 6A to 6C are cross-sectional views showing fabrication process of the photodiode-forming member 11.

First, after forming an oxide layer 22 on a silicon substrate 21, the oxide layer 22 on a region, where an optical fiber-fixing groove 13 and a reflector surface 14 are to be formed, is removed by means of photolithography as shown in FIGS. 5A to 5B. Next, as shown in FIGS. 5C to 5D, anisotropic etching is applied to a substrate 21 by using an etchant, such as KOH or etc., and an optical fiber-fixing groove 13 and a reflector surface 14 are formed. Next, after removing the oxide layer 22, a reflector layer 15 is formed by evaporating Au, an oxide layer serving as an insulator layer (not shown) is formed thereover and consequently the optical fiber-supporting member 12 can be obtained.

Next, as shown in FIG. 6A, after successively forming an oxide layer 24 and a resist 25 on a substrate 23 made of a N—Si substrate, the resist 25 is removed by means of photolithography except in a region where optical fiber-fixing guides are to be formed. Then, after removing the oxide layer 24 using the remaining resist 25a as a mask, the remaining resist 25a is removed. Moreover, as shown in FIG. 6B, by using a remaining oxide layer 24a as a mask, the substrate 23 is etched by anisotropic etching by a depth of about 5 μm, and thereby the optical fiber-fixing guide 16 can be formed.

Next, after removing the remaining oxide layer 24a, a resist mask for opening a region, where a photodiode 19 is to be formed, is formed. Then, after forming a P-type region 17 (see FIG. 6C) by a selective boron ions implantation using the resist mask as a mask, an anode electrode 18 is formed near the photodiode 19, and consequently a photodiode-forming member 11 can be obtained. Finally, a position of an optical fiber 20 is so adjusted that a light emitted from a light emitting surface 20a of the optical fiber 20 is incident on the photodiode 19 with high efficiency, and a light-receiving module can be fabricated by opposing the photodiode-forming member 11 to the optical fiber-supporting member 12 and sticking them together.

Figure 7:
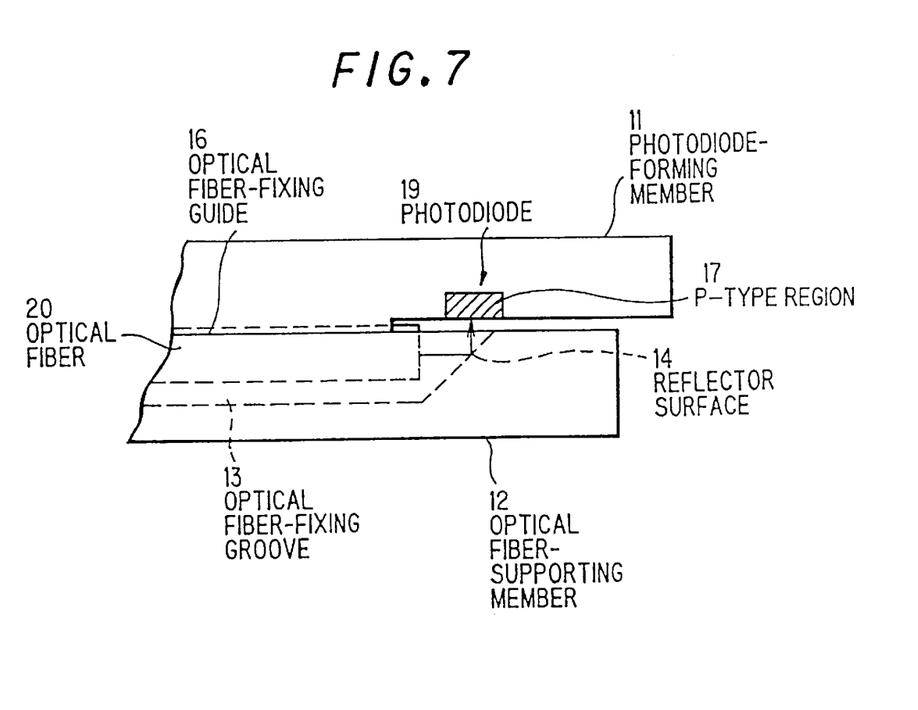
FIG. 7 is a cross-sectional view of a light-receiving module shown in FIG. 3 for explaining its operation.

Next, an operation of the aforementioned light-receiving module will be explained referring to FIG. 7. As shown in FIG. 7, since the position of the optical fiber 20 is determined by the optical fiber-fixing groove 13 on the optical fiber-supporting member 12 and the optical fiber-fixing guide 16 on the photodiode-forming member 11, a path of the light emitted from the optical fiber 20 can be shown by an arrow in FIG. 7. The light is reflected by the reflector surface 14 and certainly is incident on the P-type region 17 serving as a light absorption layer of the photodiode 19.

According to a structure mentioned in the above, since the optical fiber-fixing guide 16 is provided on the photodiode-forming member 11, an alignment of the optical axes of the optical fiber and the photodiode can be easily carried out in case that the photodiode-forming member 11 and the optical fiber-supporting member 12 are stuck together.

Moreover, even if a height of the optical fiber-fixing guide 16 is fluctuated, the light emitting surface of the optical fiber is not masked by other structural elements and an efficiency of a light incidence on the photodiode is never decreased.

As seen in FIG. 3A and FIGS. 4A to 4C, the optical fiber-fixing groove 13 is a V-shaped groove, and the optical fiber-fixing guide 16 presses the optical fiber 20 against the optical fiber-fixing groove 13. Accordingly, the position of the optical fiber 20 is precisely regulated. Moreover, the optical fiber-fixing guide 16 guides the optical fiber 20 along both its sides. Although the cross-section of the optical fiber-fixing guide 16 shown in these drawings is rectangular, it may be trapezoidal. Speaking generally, the optical fiber-fixing guide 16 should be bank-shaped.

B. The second preferred embodiment

Figure 8:
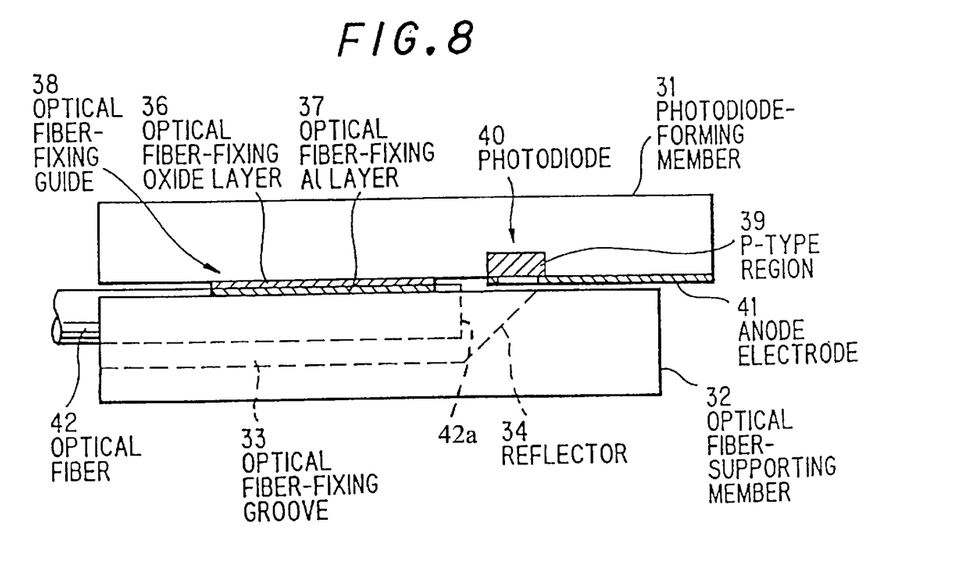
FIG. 8 is a cross-sectional view of a light-receiving module shown as the second preferred embodiment of the invention.
Figure 9A:
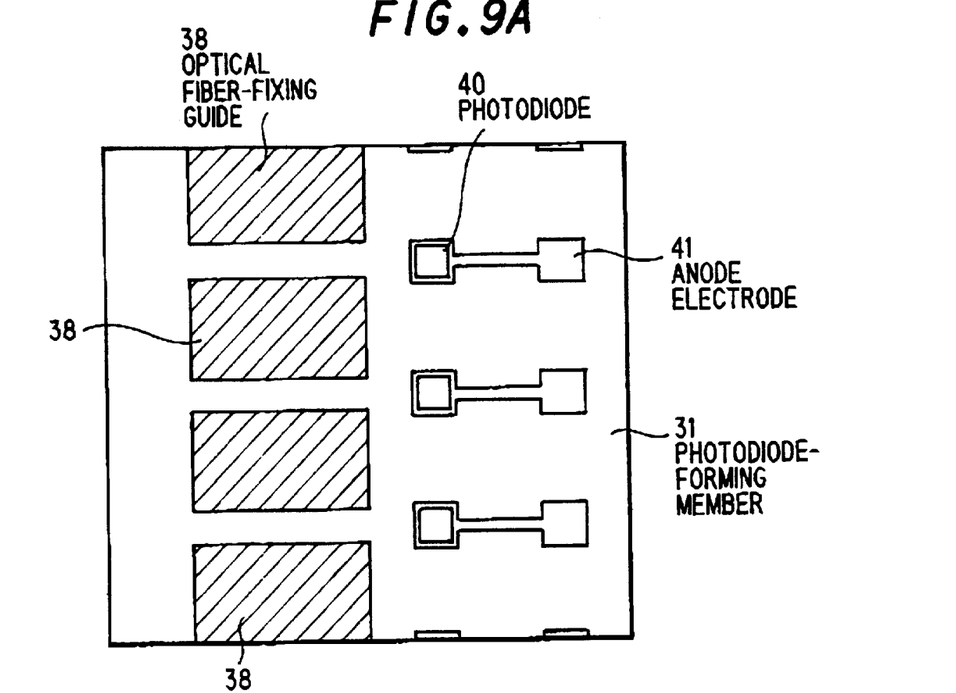
FIGS. 9A to 9B are planar views of photodiode-forming and optical fiber-supporting members of the light-receiving module shown in FIG. 8, and FIGS. 10A to 10C how a process of fabrication of the light-receiving module shown in FIG. 8.
Figure 9B:
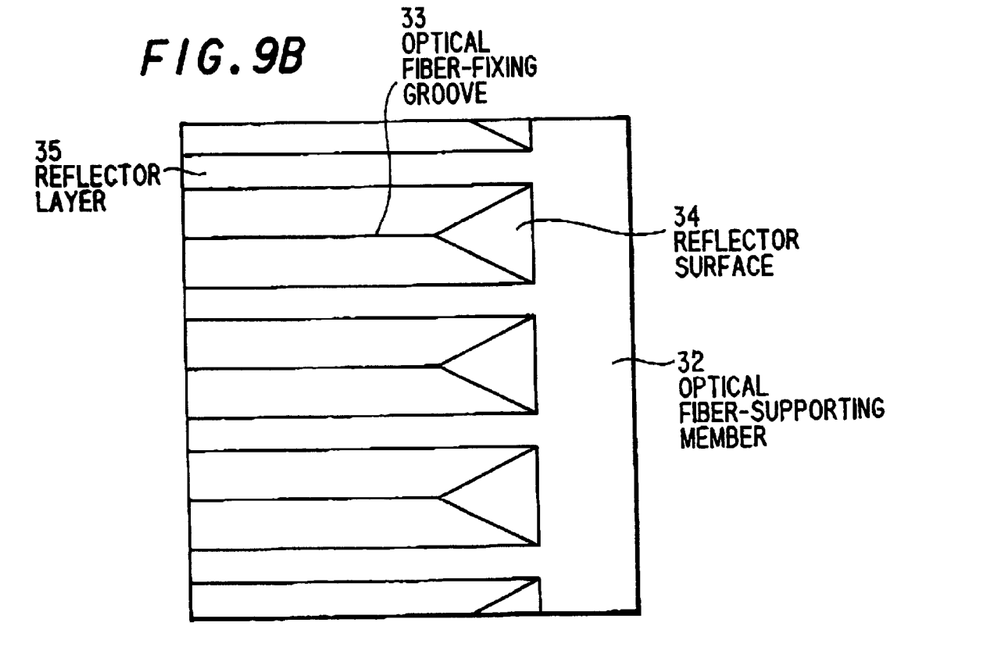

Next, the second preferred embodiment of the embodiment will be explained. FIG. 8 and FIGS. 9A to 9B shown an outline of a structure of a light-receiving module. Explaining in more detail, FIG. 8 shows a cross-sectional view of the light-receiving module, FIG. 9A shows a planar view of a photodiode-forming member 31 and FIG. 9B shows a planar view of an optical fiber-supporting member 32.

The optical fiber-supporting member 32 is made of an N—Si substrate, and as shown in FIG. 9B, an optical fiber-fixing groove 33 and a reflector surface 34 are formed thereon at certain intervals. Over a whole surface of the optical fiber-supporting member 32, a reflector layer 35 made of Au and an oxide layer (not shown) serving as an insulator are successively formed.

On the other hand, the photodiode-forming member 31 is made of a N—Si substrate, and as shown in FIG. 9A, an optical fiber-fixing guide 38, being composed of an oxide layer 36 and an Al layer 37, is formed at a position, where the optical fiber-fixing guide 38 opposes to the optical fiber-fixing groove 33 on the optical fiber-supporting member 32. Moreover, on the photodiode-forming-member 31, a nearly square-shaped P-type region 39 is formed on a position, which opposes to a reflector surface 34, and the P-type region 39 and the photodiode-forming member 31 made of the N—Si substrate form a photodiode 40. Further, on the photodiode-forming member 31, an anode electrode 41 of the photodiode 40 is formed near the photodiode 40.

This light-receiving module is fabricated as follows. The position of an optical fiber 42 is so adjusted that a light emitted from a light emitting surface 42a of the optical fiber 42 is precisely incident on the photodiode 40 by regulating an attitude of the photodiode-forming member 31 relative to the optical fiber-supporting member 32, and thereafter the photodiode-forming member 31 and the optical fiber-supporting member 32 are stuck together, and thus the light-receiving module can be obtained.

Figure 10A:
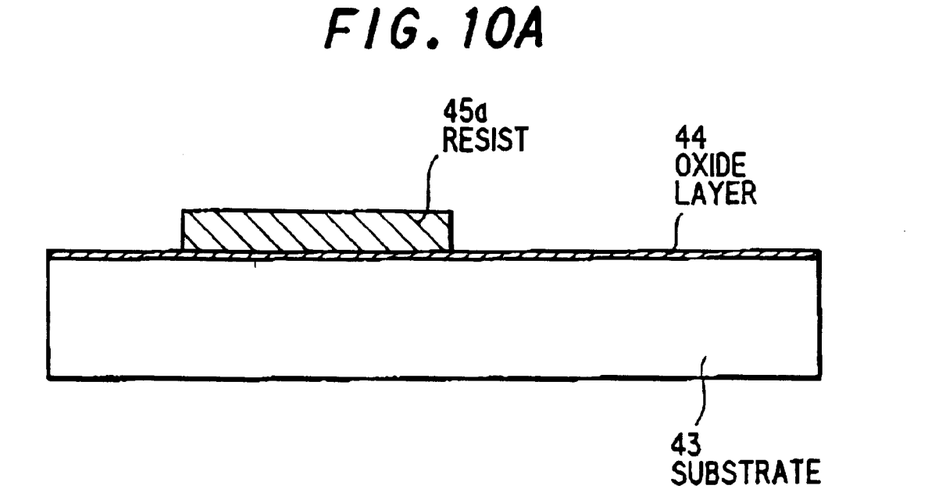
Figure 10B:
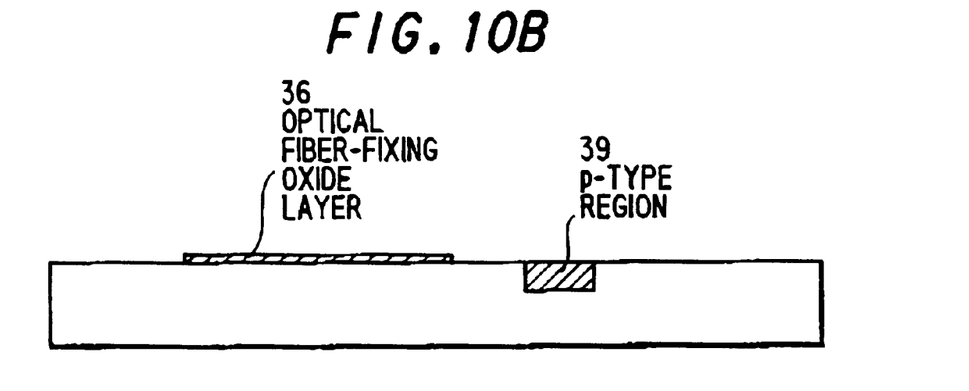
Figure 10C:
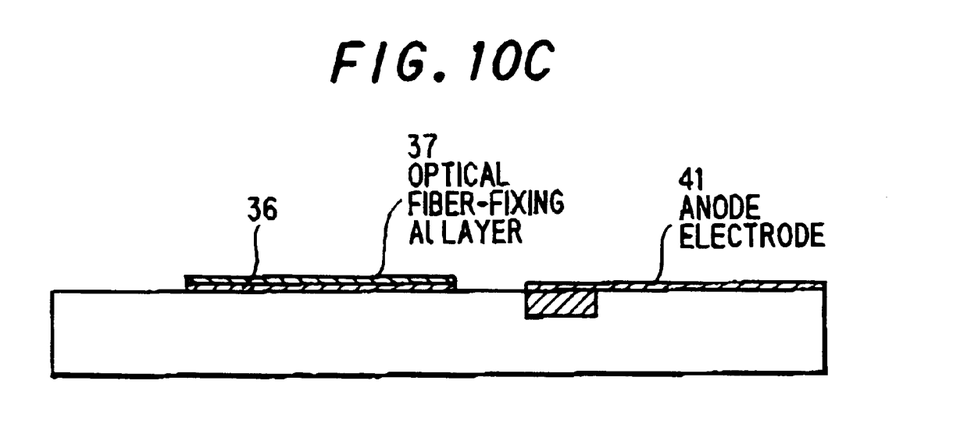

Next, a method for fabricating the light-receiving module mentioned in the above will be explained referring to FIGS. 10A to 10C. Since a method for fabricating a optical fiber-supporting member 32 is quite the same as that of the optical fiber-supporting member 12 in the first preferred embodiment (see FIGS. 5A to 5D), an explanation thereon will be omitted.

First, after forming an oxide layer 44 with a thickness of about 1 $\mu$m on a substrate 43 made of a N—Si substrate, a resist is formed thereon. As shown in FIG. 10A, the resist is removed by means of photolithography except a region, on which an optical fiber-fixing oxide layer 36 is to be formed, in order to leave the aforementioned region behind. Then, the optical fiber-fixing oxide layer 36 is formed by removing the oxide layer 44 by using a remaining resist 45a as a mask.

Next, a resist mask having an opening region, on which a photodiode 40 is to be formed, is formed. Then, a P-type region 39 shown in FIG. 10B is formed by selective boron ion implantation using the aforementioned resist mask as a mask. After successively forming an Al layer and a resist over a whole surface of the substrate 43, the resist is removed by means of photolithography except regions, on which an optical fiber-fixing Al layer 37 and an anode electrode 41 are to be formed. Then, as shown in FIG. 10C, an optical fiber-fixing Al layer 37 is formed on the optical fiber-fixing oxide layer 36 and the anode electrode 41 of the photodiode 41 is formed near the photodiode 40, by removing the Al layer using the remaining resist as a mask. Thereby the photodiode-forming member 31 can be obtained. Finally, the position of an optical fiber 42 is so adjusted that a light emitted from a light emitting surface 42a of the optical fiber 42 is precisely incident on the photodiode 40 by regulating an attitude of the photodiode-forming-member 31 relative to the optical fiber supporting member 32, and thereafter the photodiode-forming member 31 and the optical fiber-supporting member 32 are stuck together, and thus the light-receiving module can be obtained.

According to the structure mentioned in the above, the optical fiber-fixing oxide layer 36 and the optical fiber-fixing Al layer 37 form the optical fiber-fixing guide 38 as one body. Accordingly, although it is difficult to form such a thick layer as the optical fiber-fixing guide 16 shown in the first preferred embodiment, no damage caused by an etching process arises on the photodiode-forming member 31, because the N—Si substrate constructing the photodiode-supporting member 31 is not etched in the fabrication process. Then, a characteristic of the photodiode 40 does not deteriorate.

Although the embodiments of the invention have been explained referring to the appended drawings, actual structures according to the invention are never restricted to the aforementioned embodiments, and modifications of them within substance of the invention are covered by the invention.

For example, in the aforementioned second preferred embodiment, the optical fiber-fixing Al layer 37 is not necessarily required, so long as the optical fiber-fixing oxide layer 36 is sufficiently thick. Conversely, the optical fiber-fixing guide 38 is not necessarily composed of two layers of the oxide layer 36 and the Al layer 37, but may be composed of three or more layers. Still more, suitable combination of the first and second embodiments is applicable also. That is to say, the oxide layer 36, the Al layer 37 or plural layers may be formed on the optical fiber-fixing guide 16 in the first preferred embodiment.

In the first and second preferred embodiments, when the optical fiber supporting-members 12 and 32 are fabricated, the reflector layers 15 and 35 are formed over the whole surfaces of these members, and accordingly the oxide layers for insulation are formed over the whole surfaces of the substrates in the aforementioned examples. However, the oxide layer becomes unnecessary, if the reflector layers 15 and 35 are respectively formed only on the reflector surfaces 14 and 34.

As mentioned in the above, in the light-receiving module according to the invention, since the bank-shaped optical fiber-fixing guides for positioning the optical fibers guide the optical fibers along both their sides, the alignments of the optical axes of the optical fibers and the photodiodes can be easily carried out, when the photodiode-forming and optical fiber-supporting members are stuck together.

Moreover, since the optical fiber-fixing guides are bank-shaped and guide the optical fibers along both their sides, even if the thicknesses of the optical fiber-fixing guides are fluctuated because of imperfections of the fabrication process, the light emitting surfaces of the optical fibers are not masked by other structural elements and the lights emitted from the optical fibers are incident on the photodiodes with high efficiencies.

What is claimed is that:

1. A light receiving module comprising:
   an optical fiber-supporting member, provided with:
   one or more optical fiber-fixing grooves formed on a surface of a first substrate for fixing one or more parts of one or more optical fibers near their output ends, and
   one or more light direction-changing means formed at side ends of said optical fiber-fixing grooves and directing one or more lights emitted from one or more light-emitting surfaces of said one or more optical fibers, and
   a photodiode-forming member, which is provided with:
   one or more photodiodes having one or more light receiving surfaces and arrayed on a second substrate at a certain interval, said one or more light receiving surfaces being set close to said one or more light-emitting surfaces of said one or more optical fibers, and
   at least two raised portions arranged on a portion of the second substrate, with a gap having a bottom portion provided between each of two raised portions, said raised portions spaced apart from said photodiode along a longitudinal direction and adapted for pressing said one or more optical fibers against said optical fiber-fixing grooves without masking said one or more light-emitting surfaces, said bottom portion of said gap being flush with a surface of said photodiode-forming member,
   wherein, an attitude of said photodiode-forming member relative to said optical fiber-supporting member is so adjusted that said one or more lights are precisely incident on said corresponding one or more light receiving surfaces, and both said photodiode-forming and optical fiber-supporting members are stuck together keeping said relative attitude unchanged.

2. A light receiving module, according to claim 1, wherein:
   each of said gaps between the raised portions forms a bank-shaped optical fiber-fixing guide, which also guides said one or more optical fibers along both sides.

3. A light receiving module, according to claim 2, wherein:
   a cross-section of each of said one or more optical fiber-fixing grooves is V-shaped and each of said optical fiber-fixing guides is one of rectangular and trapezoidal.

4. A light receiving module according to claim 2, wherein:
   said one or more optical fiber-fixing guides are formed together with said photodiode-forming member as one body.

5. A light receiving module according to claim 2, wherein:
   said one or more optical fiber-fixing guides are composed of one or more optical fiber-fixing layers formed on said photodiode-forming member.

6. A method for fabricating a light-receiving module comprising:
   forming one or more optical fiber-fixing grooves for fixing one or more parts of one or more optical fibers near their side ends on a first substrate, said one or more optical fiber-fixing grooves running in parallel with each other at a certain interval,
   forming one or more light direction-changing means for changing one or more directions of one or more lights incident thereon by almost right angles, formed at one or more side ends of said one or more optical fiber-fixing grooves,
   forming a reflector layer over a whole surface of said first substrate and said one or more light direction-changing means,
   forming an insulator layer over said whole surface of said first substrate and said one or more light direction-changing means and consequently obtaining an optical fiber-supporting member,
   forming one or more optical fiber-fixing guides having a bottom portion and lateral faces and running in parallel with one or more optical axes of said one or more optical fibers for guiding said one or more optical fibers along two respective lateral faces, on a surface of a second substrate of a first conductivity type at said certain interval,
   forming one or more regions of a second conductivity type by means of selective ion implantation spaced apart from one or more side ends of said one or more optical fiber-fixing guides, which communicate with said one or more regions of the second conductivity type on said second substrate and consequently obtaining a photodiode-forming member, wherein said bottom portion of said optical fiber-fixing guides is flush with said surface of said photodiode-forming member,
   so adjusting an attitude of said photodiode-forming member relative to said optical fiber-supporting member that said one or more lights emitted from said one or more light-emitting surfaces of said one or more optical fibers are incident on said corresponding one or more light receiving surfaces of said one or more photodiodes, after their directions are changed by said corresponding one or more light direction-changing means, and sticking said photodiode-forming and optical fiber-supporting members together keeping said relative attitude unchanged.

7. A method for fabricating a light-receiving module according to claim 6, wherein:

said step of forming said one or more optical fiber-fixing guides comprises the step of forming a same by means of anisotropic etching applied to said second substrate.

8. A method for fabricating a light receiving module according to claim 6, wherein:

forming said one or more optical fiber-fixing guides comprises forming each of a same by successively forming one or more optical fiber-fixing layers on said second substrate.

9. A light receiving module, comprising:

an optical fiber supporting member having a first surface with at least one groove therein that accepts an optical fiber, the at least one groove having a reflector; and a photodiode forming member having a second surface with at least one photodiode formed therein, the second surface including raised optical fiber fixing portions formed thereon, wherein a space is formed between an end portion of the fiber fixing portions and the photodiode and wherein a gap is formed between a least two of the raised portions, the gap having a bottom portion flush with a surface of the photodiode and opposing the at least one groove, wherein the photodiode opposes the reflector when the first and second surfaces are aligned.

10. A light receiving module, according to claim 9, wherein the second surface, the gap, and the photodiode are substantially flush.

11. A light receiving module, according to claim 9, wherein the groove is V-shaped.

12. A light receiving module, according to claim 9, wherein the reflectors for the at least one groove includes a reflector surface at an end of the groove, the reflector surface being aligned at an angle with respect to the second surface to cause light emitted from an end of an optical fiber located in the groove to be reflected onto the photodiode when the first and second surfaces are aligned.

13. A light receiving module, comprising:

an optical fiber supporting member having means for accepting an optical fiber and means for reflecting light; and a photodiode forming member having means for detecting light and having means for guiding optical fibers, wherein a space is formed between an end portion of the means for guiding optical fibers and the means for detecting light, and a gap is formed between the means for guiding optical fibers, said gap having a bottom portion flush with the light-detecting means and opposing the means for accepting optical fibers, wherein the means for detecting light opposes the means for reflecting light when the photodiode forming member and the optical fiber supporting member are aligned.

14. A method of forming a light receiving module, comprising:

forming an optical fiber supporting member having a first surface with at least one groove therein for accepting an optical fiber, the at least one groove having a reflector; and forming a photodiode member having a second surface with at least one photodiode formed therein, the second surface including optical fiber fixing guides thereon, wherein a space is formed between an end portion of the fiber fixing guide and the at least one photodiode, and a gap is formed between at least two of the guides, said gap having a bottom portion flush with said second surface of the photodiode and opposing the at least one groove, wherein the photodiode opposes the reflector when the first and second surfaces are aligned.

15. A method according to claim 14, wherein forming a photodiode member includes:

(a) forming an oxide layer on a substrate;

(b) forming on the oxide layer a resist corresponding to the guides;

(c) etching the oxide layer and the substrate using the resist as a mask;

(d) removing the resist and the remaining oxide layer; and (e) forming the photodiode within the substrate.

16. A method according to claim 14, wherein forming the photodiode member includes:

(a) forming an oxide layer on a substrate;

(b) forming on the oxide layer a resist corresponding to the guides;

(c) etching the oxide layer using the resist as a mask;

(d) removing the resist;

(e) forming the photodiode within the substrate.

17. A method according to claim 16, further comprising:

(f) forming an optical fiber fixing layer on the remaining oxide.

18. A method according to claim 14, wherein forming the optical fiber supporting member includes:

(a) forming an oxide layer on a substrate;

(b) removing portions of the oxide corresponding to the at least one groove to expose a portion of the substrate; and (c) etching the portion of the substrate that is exposed to provide the at least one groove and reflector corresponding thereto.

19. A method according to claim 18, further comprising:

(d) forming a reflector layer on the optical fiber supporting member.

20. A light receiving module, according to claim 9, wherein a cross-section of the gap is trapezoidal.

* * * * *